United States Patent [19]

Leshay et al.

[11] Patent Number: 5,568,627
[45] Date of Patent: Oct. 22, 1996

[54] HEADER VERIFICATION IN A DISK DRIVE USING SECTOR HISTORIES FOR IMPROVED FORMAT EFFICIENCY

[75] Inventors: Bruce Leshay, West Boylston; Bruce Buch, Westboro, both of Mass.

[73] Assignee: Quantum Corporation, Milpitas, Calif.

[21] Appl. No.: 223,415

[22] Filed: Apr. 5, 1994

[51] Int. Cl.⁶ .................................................. G06F 12/00
[52] U.S. Cl. ................. 395/439; 371/40.1; 360/72.2; 364/236.2; 364/253.1; 364/268.3; 364/DIG. 1
[58] Field of Search ........................... 395/840, 824, 395/497.01, 444, 439, 412, 405, 404; 371/2.2, 21.1, 21.6, 40.1, 67.1; 369/32, 43, 44.25; 360/47–49, 53, 69, 72.2

[56] References Cited

U.S. PATENT DOCUMENTS

| Re. 34,003 | 7/1992 | Weng | 360/72.2 |
|---|---|---|---|
| 4,949,200 | 8/1990 | Weng | 360/72.2 |
| 5,036,408 | 7/1991 | Leis et al. | 360/48 |
| 5,241,521 | 8/1993 | Shigemori | 369/32 |
| 5,268,798 | 12/1993 | Shinn | 360/48 |
| 5,268,803 | 12/1993 | Sugita et al. | 360/77.08 |
| 5,274,509 | 12/1993 | Buch | 360/48 |
| 5,432,762 | 7/1995 | Kubo et al. | 369/32 |

FOREIGN PATENT DOCUMENTS

| 0349687 | 1/1990 | European Pat. Off. . |
|---|---|---|
| 0549153A2 | 6/1993 | European Pat. Off. . |
| WO90/03644 | 4/1990 | WIPO . |

*Primary Examiner*—Alpesh M. Shah
*Attorney, Agent, or Firm*—David B. Harrison

[57] ABSTRACT

A technique for verifying a pre-recorded header in a disk drive uses verification history to protect against errors that can cause verification failure. A head number, sector address, and upper track address (track MSB) are read from the disk and compared with corresponding expected values. The results of the 5 most recent comparisons are saved in three 5-bit memories. During each verification, a programmable selection and comparison circuit selects M of the stored indicators and determines whether at least N of them indicate a match. If so, the corresponding field is declared to be correctly verified, so that subsequent reads or writes to data blocks within the corresponding sector are allowed to proceed.

8 Claims, 4 Drawing Sheets

5,568,627

HEADER VERIFICATION IN A DISK DRIVE USING SECTOR HISTORIES FOR IMPROVED FORMAT EFFICIENCY

FIELD OF THE INVENTION

The invention relates generally to the operation of disk storage devices, and more particularly to techniques for verifying the position of a magnetic read/write head with respect to a magnetic disk in preparation for a subsequent disk data transfer.

BACKGROUND OF THE INVENTION

In so-called embedded-servo disk drives, head position or address information is placed at various locations on the disk in some known relationship with associated blocks of data. The disk controller uses the position information to determine when it should read or write data. It is critical that writes only occur over data that has been requested to be over-written, and that read data is data from the requested area of the disk.

It is common to use distinct address areas on the disk for the purpose of determining position. Such an address area is commonly referred to as the "header". In a conventional manner, the header may have several sub-fields, such as a head number, sector address, and track address. The head number denotes which of multiple read/write heads in the drive is currently delivering data; the sector address indicates rotational position of the disk with respect to the head; and the track address indicates radial position of the head with respect to the disk.

Typically, when it is desired to read or write data, a microprocessor in the disk drive controller computes what the correct address for the data is. When it reads a header, it compares that address to the address read in the header, and only allows the read or write to proceed if the addresses match. This process is known as "verifying the header".

To verify the header, the minimum information that is required in the header is one copy of the address information. However, using only this bare minimum renders the verification very sensitive to normal errors that occur when reading from the disk. Such errors arise, for example, from media defects or noise. If the single copy were not completely error-free, verification would fail and the data transfer would be unable to proceed. Such operation might be problematic in disk drives with normal, non-zero error rates.

In an alternative scheme, multiple copies of the address information are placed in the header so that a measure of redundancy is achieved. The header can then be verified even if not all copies are perfect, as long as some threshold number of copies match each other. While this scheme substantially improves error tolerance, it does so by increasing the area required for the header, thus decreasing the disk area available for storage of data. This scheme is therefore said to suffer from reduced "format efficiency" of the disk.

SUMMARY OF THE INVENTION

It is the object of the invention to improve disk format efficiency without sacrificing the robustness and error tolerance that are necessary for header verification. To that end, the invention relies on only a single copy of some address information in the header, and maintains a history of recent verifications that is used to improve the error tolerance of the verification process. More specifically, the invention is a method of verifying a target one of a series of prerecorded addresses on a disk, the method comprising the steps of (i) establishing an expected address representing the expected value of one of the addresses preceding the target address; (ii) reading the one address from the disk; (iii) comparing the expected address with the one address to generate a present indicator whose value indicates whether there is presently a match therebetween; (iv) storing the present indicator, the stored indicator being subsequently referred to as a historical indicator; (v) continually repeating the steps of establishing, reading, comparing, and storing for subsequent addresses until the target address is expected to be encountered next, the storing step being carried out during each repetition such that a predetermined number of the most recent historical indicators are retained; (vi) repeating the steps of establishing, reading, and comparing for the target address; (vii) tallying, after the comparing step has been carried out for the target address, the number of matches indicated by the present indicator and the retained historical indicators; and (viii) comparing the tallied number of matches with a predetermined threshold value, the target address being declared as verified only if the tally is at least the predetermined threshold value.

A preferred embodiment of the invention is used to verify three separate fields in a disk header, namely the head number, sector address, and upper portion of the track address. The lower portion of the track address is verified in a conventional fashion by comparing multiple redundant copies recorded on the disk. The track address is split such that the upper portion cannot change between verifications without the lower portion also changing.

By thus relying on only a single copy of the address to be verified, the method uses a shorter header, so that format efficiency is improved. Robustness is not sacrificed, however, because the historical indicators provide a form of redundancy that enables correct verification even in the presence of errors. In the preferred embodiment, the head number, sector address, and upper track address change slowly and predictably compared with the interval between verifications, so that their recent values are good indicators of what their current value should be during a given verification. The invention thus takes better advantage of the predictability of position information under common operational circumstances than do prior verification techniques.

BRIEF DESCRIPTION OF THE DRAWINGS

An embodiment of the invention will be described with reference to the accompanying drawings, in which.

DETAILED DESCRIPTION

Figure 1:
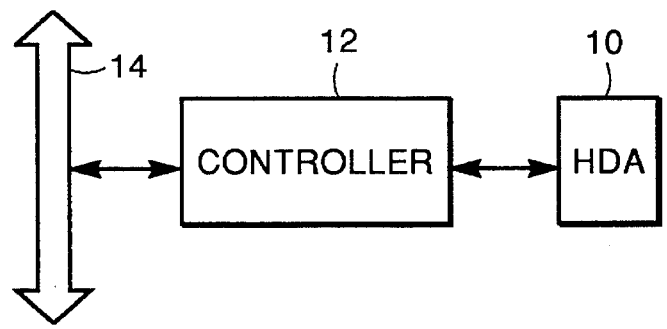
FIG. 1 is a block diagram of a disk storage system in accordance with the principles of the present invention.

FIG. 1 shows a simplified block diagram of a disk storage system embodying the principles of the present invention. A head-disk assembly (HDA) 10 contains magnetic storage disks, read/write heads, and various other conventional mechanical and electrical components as is known in the art. A disk controller 12 is coupled between the HDA 10 and a storage interconnect bus 14. The disk controller 12 contains a variety of electrical components to control the operation of the HDA 10 and to effect data transfer between the HDA 10 and the storage interconnect bus 14.

At the level of FIG. 1, the illustrated arrangement is fairly typical in the art of disk data storage. The storage interconnect bus 14 is of a type that can be connected to a host CPU having a suitable interface. For example, it may be a Small Computer System Interconnect (SCSI) bus, which is an industry-standard bus particularly suited for providing storage interconnect. The particular type of bus is not germane to the present invention. The HDA 10 is also in many respects conventional, although the disks therein enjoy greater format efficiency in accordance with the objects of the invention. This effect is described in greater detail below, as are specific features of the controller 12 embodying the present invention.

Figure 2:
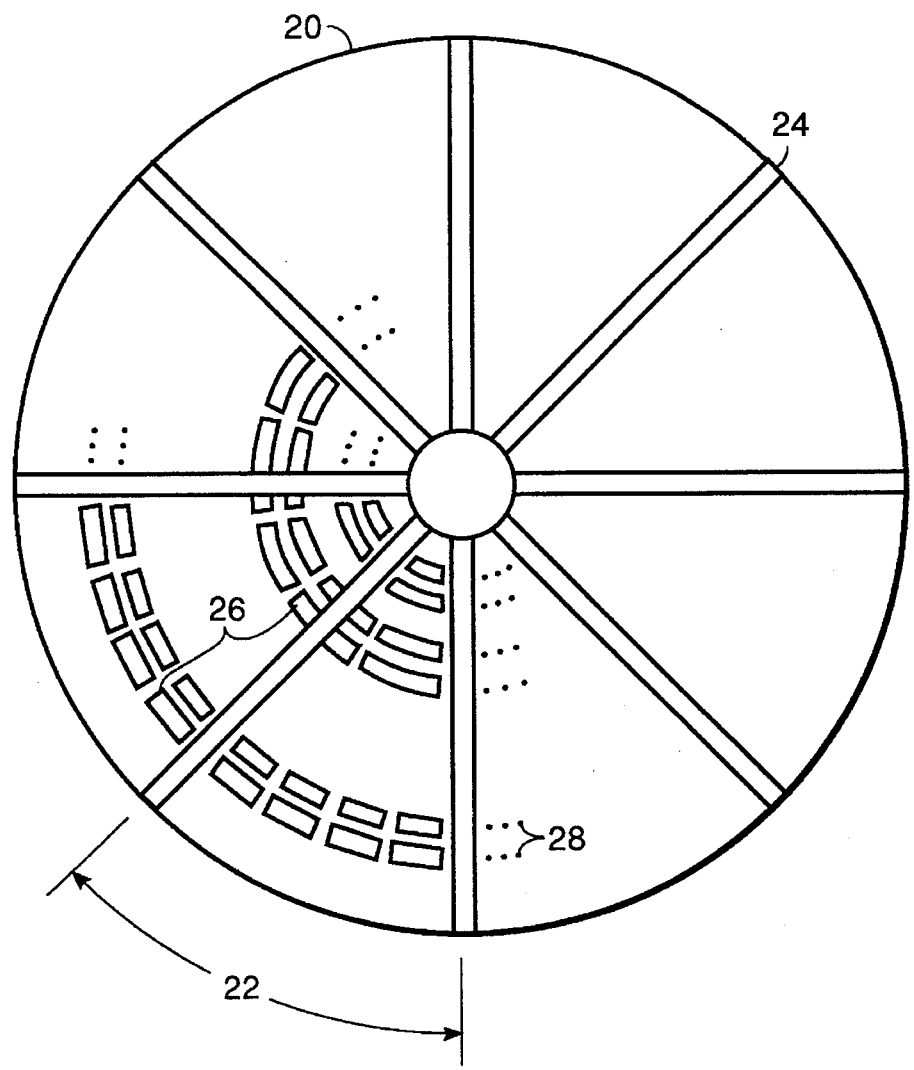
FIG. 2 is a schematic diagram of the format of a magnetic disk within the disk storage system of FIG. 1.

FIG. 2 illustrates the format of a magnetic disk 20 within the HDA 10 of FIG. 1. The disk 20 is divided into sectors 22 by a number of radially-extending spokes 24 placed at regular angular intervals. The spokes 24 are areas on the disk containing information used for synchronization, servo control, and sector identification, as is described in greater detail with reference to FIG. 3, below. The sectors 22 are areas on the disk containing data blocks 26 each having a fixed amount of data, for example 512 bytes. As shown, the data blocks 26 occupy circular tracks 28 on the disk 20.

Figure 3:
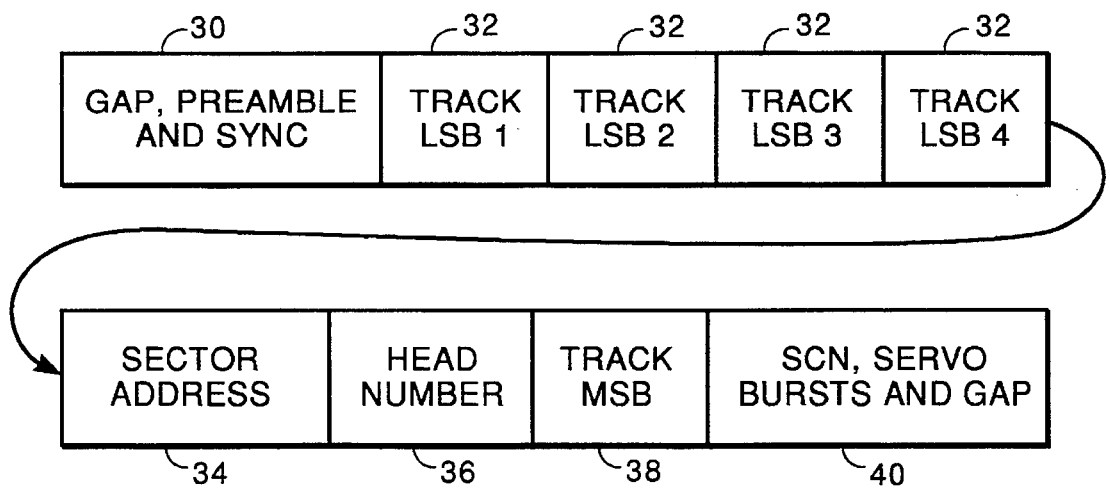
FIG. 3 is a schematic diagram of the format of an area of the disk of FIG. 2 known as a "spoke header"

FIG. 3 shows the format of the portion of each track 28 within a spoke 24, referred to as a "spoke header" or simply "header". The spoke portion contains a section 30 having an unrecorded gap and recorded preamble and sync fields in a conventional manner. This is followed by up to 4 duplicated copies of a "track LSB" 32, which represents the least significant portion of the track address, which is the address of the track 28 containing the header. The track LSBs 32 are followed by a sector address 34, a head number 36, and a track MSB 38 representing the most significant portion of the track address. In the illustrated embodiment, the track LSB 32 is a Gray-coded form of the lower 8 bits of the binary track address. The sector address 34 is a 7-bit field specifying a spoke number. The head number 36 is a 5-bit field specifying the disk surface, and the track MSB 38 is the upper 5 bits of the track address non-encoded. The final part of the spoke portion is a section 40 containing servo-specific information and another gap. The section 40 typically includes servo signal bursts used for head position detection, and may also include a servo correction number (SCN) or other information of use to the head control servomechanism.

The various fields shown in FIG. 3 are collectively referred to as a "header"; the track LSB 32, track MSB 38, sector address 34, and head number 36 are also collectively referred to as the "address" of a portion of a track 28 lying in a given sector 22. The blocks 26 of FIG. 2 are identified by their offset from the preceding spoke 24. This offset may be indicated by an additional address header appended to each block, or it may be simply a predetermined rotational offset so that block headers are not required.

As mentioned, the track LSB 32 is an 8-bit field that is encoded to 18 cells on the disk medium using a 4/9 Gray code. The 4/9 Gray code has the following properties:

1. The number of flux transitions in a code word is constant. For the code described below, there are 3 flux transitions in each 9-cell code word.

2. The codewords of adjacent encoded binary track addresses differ by only one flux transition, the position of which differs by one cell.

3. The code satisfies the run-length constraint of the code used for the data, which in general is different from that used for the track address. For example, Digital Equipment Corp. uses a rate-2/3 code with a (1,7) run-length constraint for the data code in its disk products; the track address code shown below also satisfies the (1,7) run-length constraint.

The procedure for encoding binary track LSB's is as follows:

1. Convert the lower 8 bits of the binary track address (BTA) to an intermediate Gray code (IGC) according to the following algorithm:
   IGC<7>=BTA<7>; and
   IGC<i>=BTA<i> xor BTA <i+1> for i from 0 to 6

2. Split IGC<7:0> into 2 4-bit nibbles, IGC<7:4> and IGC<3:0>.

3. Encode each of IGC<7:4> and IGC<3:0> according to the following 4/9 Gray code:

| 0000 | 100010100 |
|------|-----------|
| 0001 | 010010100 |
| 0011 | 010100100 |
| 0010 | 010100010 |
| 0110 | 010010010 |
| 0111 | 001010010 |
| 0101 | 001001010 |
| 0100 | 010001010 |
| 1100 | 100001010 |
| 1101 | 100010010 |
| 1111 | 100100010 |
| 1110 | 101000010 |
| 1010 | 101000100 |
| 1011 | 101001000 |
| 1001 | 100101000 |
| 1000 | 100100100 |

4. Concatenate the two 9-bit results.

Part of the function of the header is to enable the controller 12 to ascertain the current position of the disk under the read/write heads; the controller 10 needs this position information in order to know when it should read or write data to or from the disk 20. In preparation for a data transfer, the controller 10 computes what the correct address for the data is, i.e., the addresses of the track 28 and sector 22 where the data block 26 to be read or written is located. The controller 10 computes these values from the address accompanying the read or write request on the storage interconnect bus 14 in a conventional manner. The controller 10 reads spoke headers as the disk rotates, compares their contents with the computed address, and only allows the read or write to proceed when the addresses match. This process is called "verifying the header". The manner in which the controller 10 verifies the header is described in detail with reference to the remaining Figures.

Verification of the track LSB proceeds as follows. In the illustrated embodiment, the track LSB 32 is replicated up to 4 times to ensure accurate reading of the low-order track address when seeking, and also to ensure immediate determination of any off-track error during detent. In detent, each copy that is read from the disk is compared against a predicted track address. The manner in which track addresses are predicted is described in more detail below. Normal operation is indicated when at least a threshold number of copies matches the predicted address; an error condition is indicated otherwise. During seeks, a slightly different verification technique is used. The controller 10 correlates the track LSB copies 32 and generates a "best guess". The best guess is a copy that either exactly matches a preceding copy or differs from a preceding copy by no more than the least significant bit.

The verification of the sector address 34, head number 36, and track MSB 38 is quite different. While it is possible for them to be verified in the same fashion as the track LSB 32, as indeed prior systems have done, such a method would require duplicating these fields as well, thus reducing format efficiency. Instead, their verification relies partially on other known characteristics of the disk drive system, so that undesirable replication is avoided. The values of the sector address 34, head number 36, and track MSB 38 do not change as quickly as does the value of the track LSB 32, so the controller 12 can rely partially on their recent history when verifying their respective values. For example, the controller 12 typically performs as many data transfers as possible to or from a given surface before switching to another surface. After a head switch, then, the value of head number 36 is very predictable until the next head switch occurs. Similarly, the read/write head position cannot change by a large number of tracks or sectors quickly, so that the sector address 34 and track MSB 38 are also highly predictable over the interval between separate verifications.

Figure 4:
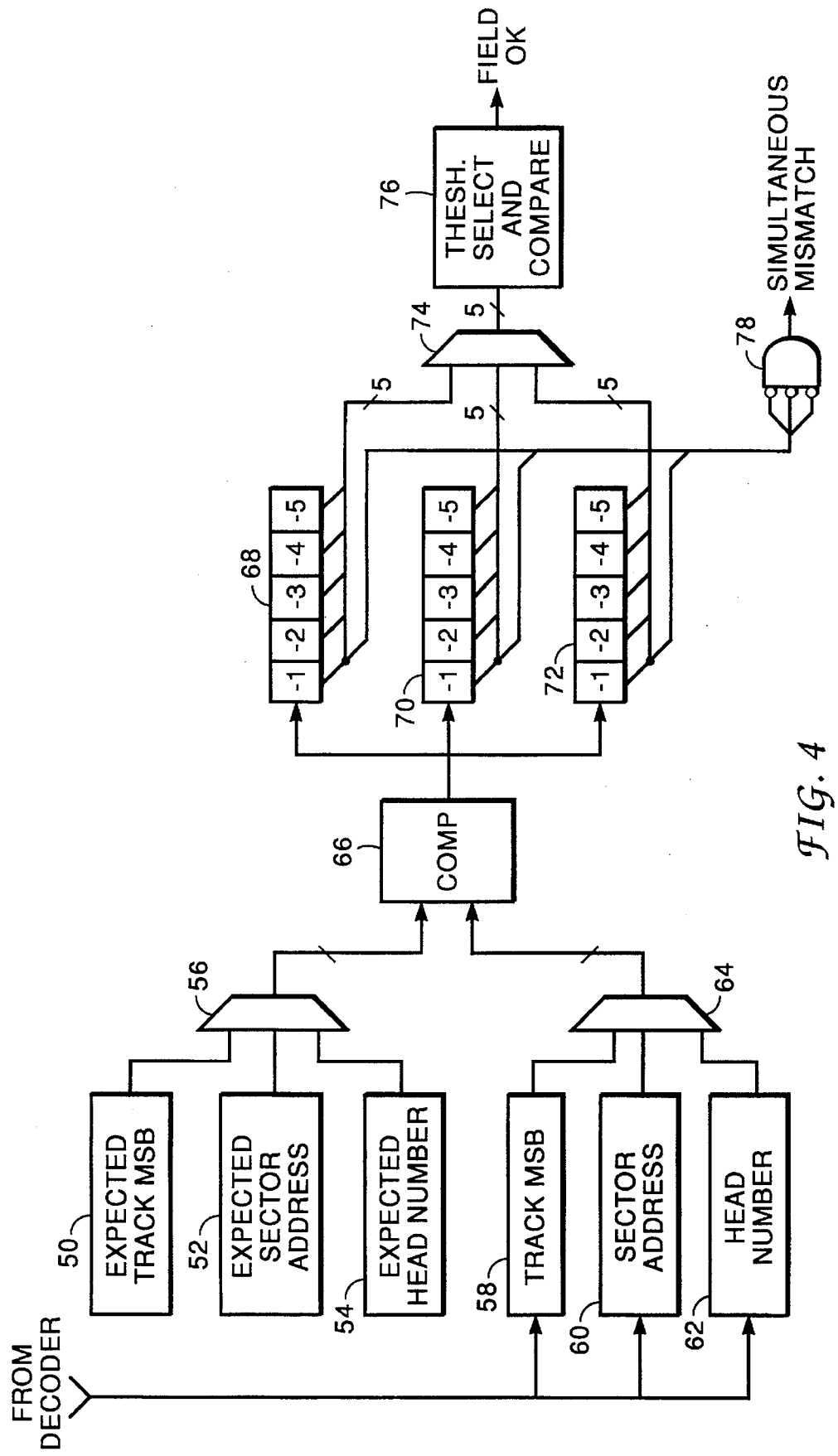
FIG. 4 is an overall block diagram of header verification logic within the disk storage system of FIG. 1 responsible for verifying portions of the spoke header of FIG. 3.

FIG. 4 shows header verification logic within the controller 12 that is used to verify the track MSB 38, sector address 34, and head number 36 of FIG. 3. Expected values for these fields are respectively loaded into registers 50, 52, and 54; the manner in which these expected values are determined is described below. The outputs from the registers 50, 52, and 54 are provided to a multiplexer 56. Decoded disk data is fed to a TRACK MSB register 58, SECTOR ADDRESS register 60, and HEAD NUMBER register 62; the output from these registers is in turn fed to another multiplexer 64. The outputs of the multiplexers 56 and 64 are provided to a comparator 66 whose output indicates whether the selected expected and actual values match.

The output of the comparator 66 is fed to three 5-bit memories 68, 70, and 72. Memory 68 is associated with the track MSB 38; memory 70 is associated with the sector address 34; and memory 72 is associated with the head number 36. Each memory is capable of storing the 5 most recent match results for the corresponding header field. The outputs from the memories 68, 70, and 72 are fed to another multiplexer 74 whose 5-bit output is provided to a threshold select and compare circuit 76. The output from the threshold select and compare circuit 76 is a signal "FIELD OK" signifying that the field being examined has been successfully verified. The threshold select and compare circuit 76 is described in greater detail below with reference to FIG. 5. The "−1" output of each memory 68, 70, and 72 is also fed to an AND gate 78 whose output is a signal SIMULTANEOUS MISMATCH signifying that the most recent comparisons on all three fields have failed.

Each memory 68, 70, and 72 contains the results of the last 5 comparisons between the expected and actual values of the corresponding field. This is depicted in FIG. 4 by the numbers −1, −2, ..., −5, where more negative numbers indicate older historical results. The threshold select and compare circuit 76, then, has provided to it the 5 most recent comparison results for the three relevant address fields. From this information, the threshold select and compare circuit 76 determines whether the expected field has been encountered.

The "−1" indicator is also referred to herein as the "present indicator", because it is the most recent. In the illustrated embodiment, it is stored in the same 5-bit memory as the historical indicators −2, −3, −4, and −5. However, in alternative embodiments it may be advantageous to use a separate storage device for the present indicator, and to reduce the size of the associated memory by one. Regardless of how it is stored, the term "present indicator" refers to the most recent comparison result for the corresponding field.

It should be noted that in alternative embodiments the memories 68, 70, and 72 may be registers, latches, or other memory-like devices.

The expected value registers 50, 52, and 54 are normally loaded by higher-level mechanisms within the controller 12. The primary loading mechanism is an operational mode called "Acquire Address", in which the expected track MSB register 50 is loaded with an address read from the HDA 10. The "Acquire Address" mode is described in greater detail below. Additionally, a conventional microprocessor is commonly employed within the controller 12 to control and monitor its operation. The microprocessor is able to load these registers as a fallback mechanism, and also to facilitate testing.

The expected track MSB register 50 is also incremented or decremented when the track LSB overflows in the corresponding direction. This updating is achieved as follows. The controller 10 maintains both a "current best guess" and a "previous best guess" of the track LSB 32 for position tracking during seeks. As mentioned above, the current best guess is computed by correlating the copies of the track LSB 32 as they are read from the disk. The previous best guess is a retained copy of the best guess from the preceding header. Once a current best guess is found, the previous best guess is subtracted from it for the purposes of updating the expected track MSB. The carry out and MSB of the result are compared to determine how to update the expected track MSB as follows:

| Carry | MSB | Action |
|-------|-----|--------|
| 0 | 0 | Increment Track MSB |
| 0 | 1 | Do Nothing |
| 1 | 0 | Do Nothing |
| 1 | 1 | Decrement Track MSB |

Like the expected track MSB register 50, the expected sector address register 52 is loaded during the "Acquire Address" mode of operation, and can also be loaded by the microprocessor. This register is also auto-incremented once each sector time, modulo the number of spokes 24.

The expected head number register 54 is loaded by the microprocessor during initialization and upon a head switch.

The memories 66, 68, and 70 may conveniently be directly loadable by the microprocessor for purposes such as testing and initialization.

The threshold select and compare circuit 76 is programmable. By writing appropriate binary values to it, the controller 12 can dictate (1) how many of the 5 historical indicators are to be examined, and (2) how many of the examined indicators must indicate a match in order to declare that the header has been correctly verified. For example, the controller 12 might choose to examine all 5 indicators, and be satisfied if 3 out of the 5 match. The appropriate values to be programmed depend on several factors, such as the error rate of the HDA 10, performance specifications, and availability specifications for the overall disk drive system. There are several factors to be considered, some of which are the following:

a) The more indicators examined, the longer it takes to confirm position after a head switch, the lower is the confidence in the result for a given threshold, and the greater is the error tolerance.

b) The higher the match threshold, the longer it takes to confirm position after a head switch, the greater is the confidence in the result for a given number of examined indicators, and the lower is the error tolerance.

The AND gate 78 provides an additional level of error protection by indicating whether a mismatch has occurred on all three fields simultaneously. The rationale for this added feature is that the simultaneous occurrence of 3 mismatches may indicate either some type of gross mis-synchronization or an inadvertent head switch, events that destroy the predictability assumptions upon which the verification technique is based.

As is apparent from FIG. 4, the various fields of the header are examined sequentially, rather than in parallel, so that the existence of a sequencing controller or sequencer is implied. While such a sequencer is not explicitly shown in FIG. 4, the design of a suitable sequencer may be readily derived from the operational description in connection with FIG. 6 below.

Figure 5:
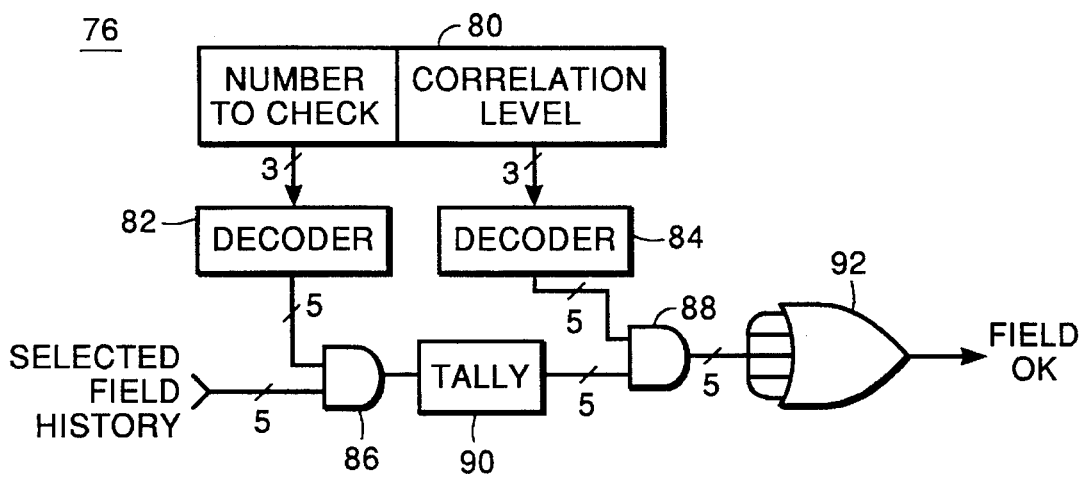
FIG. 5 is a more detailed block diagram of a portion of the header verification logic of FIG. 4.

FIG. 5 shows the threshold select and compare block 76 of FIG. 4 in greater detail. A programmable header correlation register 80 contains two binary values. One value, NUMBER TO CHECK, represents the number of bits in the selected field's history to examine; the other value, CORRELATION LEVEL, represents the number of examined bits that must match for verification to succeed. These values are provided to a pair of decoders 82, 84. The output from the NUMBER TO CHECK decoder 82 is routed to a first set of AND gates 86; the output from the CORRELATION LEVEL decoder 84 is routed to a second set of AND gates 88. The 5-bit field history selected by the multiplexer 74 of FIG. 4 is also provided to the first AND gates 86, and their outputs are provided to a conventional 5-bit tally circuit 90. Output <i> of the tally circuit 90 is set if at least i inputs are set. The outputs from the tally circuit 90 are provided to the second AND gates 88. The outputs from the second AND gates 88 are wired to a 5-input OR gate 92, the output of which is the signal "FIELD OK".

The following tables describe the use of the NUMBER TO CHECK and CORRELATION LEVEL fields in the header correlation register 80:

TABLE 1

| | NUMBER TO CHECK | |
|---|---|---|
| Binary Value | Decoder 82 Output | Number of Most Recent History Bits Examined |
| 000 | — | (unused) |
| 001 | 00001 | one |
| 010 | 00011 | two |
| 011 | 00111 | three |
| 100 | 01111 | four |
| 101 | 11111 | five |
| 110 | — | (unused) |
| 111 | — | (unused) |

TABLE 2

| | CORRELATION LEVEL | |
|---|---|---|
| Binary Value | Decoder 84 Output | Number of Matches Required |
| 000 | — | (unused) |
| 001 | 00001 | one |
| 010 | 00010 | two |
| 011 | 00100 | three |
| 100 | 01000 | four |
| 101 | 10000 | five |
| 110 | — | (unused) |
| 111 | — | (unused) |

In FIG. 5, the AND gates 86 serve as a mask to allow only some bits of the selected field to be tallied, while the AND gates 88 determine whether the tally is greater than or equal to CORRELATION LEVEL.

Regarding the threshold compare and select block 76, it should be pointed out that only one embodiment has been described, and that other implementations could be created that use the same inputs and produce the same results but internally process the data differently. In particular, the decoders 82 and 84 may in alternative embodiments function other than as shown in Tables 1 and 2, but when coupled with corresponding changes to the remaining logic yield the same overall result.

Figure 6:
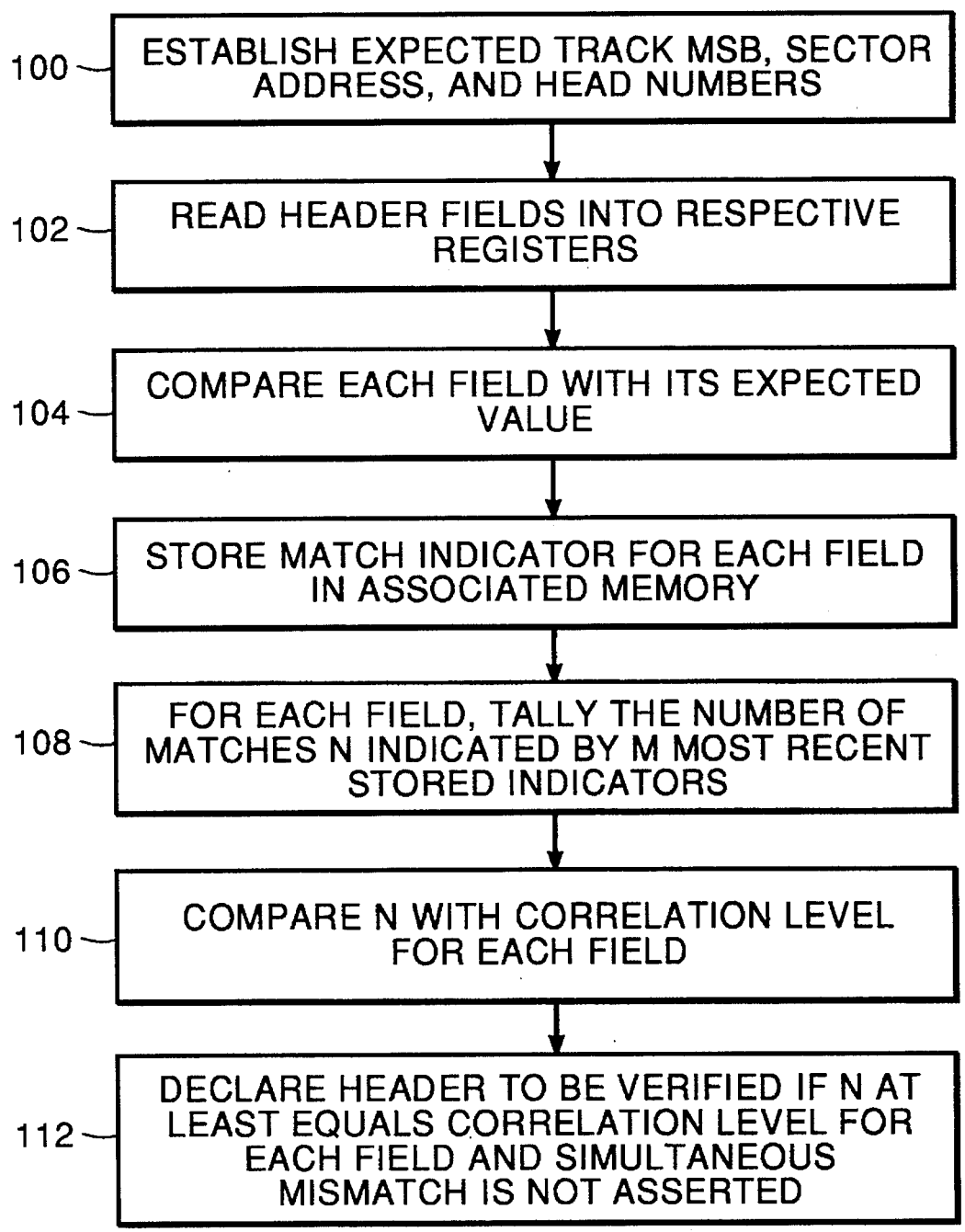
FIG. 6 is a flow diagram depicting the operation of the disk storage system of FIG. 1 when the spoke of FIG. 3 is being verified in preparation for a subsequent data transfer.

Turning now to FIG. 6, the operation on the controller 10 during header verification is described. In step 100, the expected values for track MSB, sector address, and head number are established and loaded into their corresponding registers 50, 52, and 54. These values are established by the microprocessor as described above, or, for the track MSB and sector address, they may also be established during the "Acquire Address" mode described below.

In step 102, the various fields of the header are read from the disk and stored in their corresponding registers 58, 60, and 62. Because the fields are coming off the disk sequentially, it is possible (and in fact desirable) to overlap the verification of early-arriving fields with the loading of later-arriving fields into the registers.

In step 104, the contents of each register 58, 60, and 62 is compared with the contents of the corresponding one of registers 50, 52, and 54. The multiplexers 56 and 64 must of course be controlled to provide the correct inputs to the comparator 66 at each stage.

In step 106, the output of the comparator is sequentially loaded into the memories 68, 70, and 72. These most recent match indicators displace the oldest stored indicators, which in the illustrated embodiment are stored in the "−5" positions. Each set of historical indicators is sequentially provided to the threshold select and compare circuit 76 through the multiplexer 74.

In step 108–110, M of the historical indicators of each field are examined for matches, where M represents the value NUMBER TO CHECK. The M selected indicators are provided to the tally circuit 90 of FIG. 5. The output of the tally circuit 90, which indicates N matches, is compared with CORRELATION LEVEL to determine whether sufficient matches have occurred.

In step 112, the header is declared to be correctly verified if N is greater than or equal to CORRELATION LEVEL and the signal SIMULTANEOUS MISMATCH is not asserted. When verification is successful, reads and writes to blocks within the following sector are enabled. When verification is unsuccessful, reads and writes to blocks within the following sector are normally disabled. Such disabling may be overridden, however, if it is desired to force the controller 12 to read a following data block for the purpose of error recovery, for example. Unsuccessful verifications are also reported to the microprocessor, so that it may attempt to re-establish correct position if verification is unsuccessful on numerous sectors.

As mentioned above, the expected sector address register 52 and expected track MSB register 50 can be loaded during an operational mode called "Acquire Address". In preparation for this mode of operation, the memories 68 and 70 are pre-loaded by the controller 10 so that the number of historical matches is at least one fewer than the threshold as indicated by CORRELATION LEVEL. The next comparison of each field is forced to result in a mismatch, so that the fields are not verified. As a result, the expected value registers 50 and 52 are loaded with the values that have been most recently read from the disk, i.e., the values stored in the registers 58 and 60. This operation continues until there have been enough successful comparisons to make the number of stored match indicators equal to CORRELATION LEVEL. At this point, verification becomes successful and the expected value registers 50 and 52 are not loaded.

In the illustrated embodiment, the track address is split at bit number 8, i.e. bits (7:0) are part of the track LSB 32, and bits (12:8) are part of the track MSB 38. The address may be split elsewhere in alternative embodiments. The split should be high enough to ensure that between verifications the head cannot move by a number of tracks corresponding to the maximum value of the track LSB. In the illustrated embodiment, this value is 256. The desired split is a function of the seek velocity profile of the head, disk rotational speed, and the format of the disk.

While the present invention has been described with reference to a single embodiment, it also has application in alternative embodiments within the scope of the following claims.

What is claimed is:

1. In a disk drive having a read transducer and a storage disk, a method of identifying a target one of a series of distinct prerecorded addresses stored on the disk, said method comprising the steps of:

establishing an expected address representing an expected value of one of said addresses preceding said target address;

reading said one address from said disk with the transducer;

comparing said expected address with said one address to generate a present indicator whose value indicates whether there is presently a match therebetween;

storing said present indicator, the stored indicator being subsequently referred to as a historical indicator;

continually repeating said steps of establishing, reading, comparing, and storing for subsequent addresses until said target address is expected to be encountered next, said storing step being carried out during each repetition such that a predetermined number of the most recent historical indicators are retained;

reading a next encountered address with the transducer;

comparing said target address with said next encountered address to generate the present indicator;

tallying, after said comparing step has been carried out for said target address, the number of matches indicated by the present indicator and the retained historical indicators; and comparing the tallied number of matches with a predetermined threshold value, said target address being identified only if the tally is at least said predetermined threshold value.

2. A method according to claim 1, further comprising the step of selecting, prior to said tallying step, another predetermined number of the most recent retained historical indicators, and wherein said tallying step comprises the step of tallying the number of matches indicated by the present indicator and the selected indicators.

3. A method according to claim 1, wherein said addresses are higher-order track addresses.

4. A method according to claim 1, wherein each of said addresses is a higher-order track address and is part of a corresponding header that also includes a sector address and a header number.

5. A method according to claim 1, wherein said target address is being verified in preparation for an associated desired data transfer, and further comprising the steps of:

enabling said data transfer if the tallied number is at least said predetermined threshold value; and inhibiting said data transfer otherwise.

6. A method according to claim 1, further comprising the step of storing said present indicator for said target address prior to said tallying step.

7. In a disk drive having a read transducer and a storage disk, a method of identifying a target one of a series of distinct prerecorded headers stored on the disk in preparation for an associated desired data transfer, said method comprising the steps of:

establishing an expected high-order track address, an expected sector address, and an expected head number, each representing an expected value of a corresponding field in one of said headers preceding said target header;

reading said one header from said disk with the transducer;

comparing each of said expected values with the corresponding field from said one header to generate a set of present indicators whose respective values indicate whether there is presently a match between corresponding ones of said fields and said expected values;

storing said set of present indicators, the stored indicators being subsequently referred to as historical indicators;

continually repeating said steps of establishing, reading, comparing, and storing for subsequent headers until said target header is expected to be encountered next, said storing step being carried out during each repetition such that a predetermined number of the most recent sets of said historical indicators are retained;

reading a next encountered header with the transducer;

comparing said target header with said next encountered header to generate the set of present indicators;

selecting, for each of said fields, another predetermined number of the most recent corresponding retained historical indicators;

tallying, for each of said fields, the number of matches indicated by the corresponding present indicator and the corresponding selected indicators;

comparing, for each of said fields, the corresponding tallied number of matches with a corresponding predetermined threshold value;

enabling said data transfer if each tallied number is at least the corresponding predetermined threshold value; and inhibiting said data transfer otherwise.

8. A method according to claim 7, further comprising the step of inhibiting said data transfer whether or not each tallied number is at least the corresponding predetermined threshold value if during the repetition for said target header all of said present indicators indicate a mismatch between their corresponding fields and expected values.

* * * * *